United States Patent
Marupaduga et al.

(10) Patent No.: US 10,045,346 B1
(45) Date of Patent: Aug. 7, 2018

(54) ASSIGNING A LOW-GDV CARRIER TO A HIGH-SPEED UE

(71) Applicant: Sprint Spectrum L.P., Overland Park, KS (US)

(72) Inventors: Sreekar Marupaduga, Overland Park, KS (US); Andy M. Wurtenberger, Olathe, KS (US); Rajveen Narendran, Olathe, KS (US); Ryan P. Dreiling, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 73 days.

(21) Appl. No.: 15/225,952

(22) Filed: Aug. 2, 2016

(51) Int. Cl.
*H04W 4/00* (2018.01)
*H04W 72/04* (2009.01)
*H04L 12/26* (2006.01)
*H04W 4/02* (2018.01)
*H04M 7/00* (2006.01)

(52) U.S. Cl.
CPC ......... *H04W 72/0453* (2013.01); *H04L 43/16* (2013.01); *H04M 7/006* (2013.01); *H04W 4/027* (2013.01)

(58) Field of Classification Search
None
See application file for complete search history.

(56) References Cited

U.S. PATENT DOCUMENTS

| 9,723,535 | B1* | 8/2017 | Marupaduga | H04W 36/14 |
| 2003/0092404 | A1* | 5/2003 | Suwa | H04L 5/026 455/101 |
| 2010/0220646 | A1* | 9/2010 | Brown | H04B 7/185 370/316 |
| 2011/0235500 | A1* | 9/2011 | Shenoi | H04J 3/0632 370/201 |
| 2014/0029655 | A1* | 1/2014 | Thompson | H04B 10/0795 375/224 |
| 2015/0003479 | A1* | 1/2015 | Shenoi | H04J 3/0661 370/503 |
| 2015/0005001 | A1* | 1/2015 | Dateki | G01S 11/10 455/456.1 |
| 2015/0045040 | A1* | 2/2015 | Lai | H04W 36/32 455/441 |
| 2015/0103663 | A1* | 4/2015 | Amini | H04W 28/0215 370/235 |
| 2015/0223194 | A1* | 8/2015 | Li | H04W 24/08 455/456.1 |
| 2016/0211898 | A1* | 7/2016 | Cai | H04B 7/0617 |

(Continued)

*Primary Examiner* — Otis L Thompson, Jr.

(57) ABSTRACT

Disclosed are methods and systems for selecting a carrier on which to serve a user equipment device (UE). In particular, a base station may determine that a speed of movement of the UE is threshold high. In response to determining that the speed of movement of the UE is threshold high, the base station may select a carrier based on a group delay variation (GDV) of the selected carrier. For example, the base station may respond to the determining by selecting a carrier having a threshold low GDV. In another example, the base station may respond to the determining by selecting the carrier having the lowest GDV among two or more candidate carriers being considered as part of the selection process. As such, once a carrier is selected, the base station may then serve the UE on the selected carrier.

20 Claims, 4 Drawing Sheets

(56) References Cited

U.S. PATENT DOCUMENTS

| | | | |
|---|---|---|---|
| 2016/0234709 A1* | 8/2016 | Fischer | H04W 4/02 |
| 2017/0012649 A1* | 1/2017 | Kummetz | H04B 7/022 |
| 2017/0094052 A1* | 3/2017 | Zhang | H04M 3/2227 |
| 2017/0111156 A1* | 4/2017 | Guan | H04L 5/0055 |
| 2017/0257823 A1* | 9/2017 | Ashwood-Smith | H04W 48/18 |

* cited by examiner

ASSIGNING A LOW-GDV CARRIER TO A HIGH-SPEED UE

BACKGROUND

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with a recent version of the LTE standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz, with each carrier being divided primarily into subcarriers spaced apart from each other by 15 kHz. Further, the air interface is divided over time into a continuum of 10-millisecond frames, with each frame being further divided into ten 1-millisecond subframes or transmission time intervals (TTIs) that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier. Through the attach process and/or subsequently, the base station and supporting LTE network infrastructure may establish for the UE one or more bearers, essentially defining logical tunnels for carrying bearer data between the UE and a transport network such as the Internet.

Once attached with the base station, a UE may then operate in a "connected" mode in which the base station may schedule data communication to and from the UE on the UE's established bearer(s). In particular, when a UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. LTE also supports uplink control signaling on the PUCCH using uplink control information (UCI) messages. UCI messages can carry scheduling requests from UEs, requesting the base station to allocate PUSCH resource blocks for uplink bearer data communication.

Moreover, a revision of LTE known as LTE-Advanced now permits a base station to serve a UE with "carrier aggregation," by which a base station schedules bearer communication with the UE on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers. Each aggregated carrier is referred to as a "component carrier." Further, when multiple carriers are aggregated, one of the component carriers may be defined as a primary cell ("PCell") and the remaining component carriers may be defined as secondary cells ("SCells"). A UE served with carrier aggregation may send and receive control signals in the PCell while sending and receiving bearer data in the PCell and the SCells.

In operation, a base station typically includes amplifiers to amplify RF signals, band-pass filters to pass a configured frequency range (i.e., the pass band of the filter), and band-stop filters to block frequencies outside of the configured frequency range. For example, in some LTE deployments, a base station may be configured with filters that pass an entire LTE band (e.g., LTE Band 41) and block frequencies outside of the band. In other LTE deployments, a base station may be configured with filters that pass a portion of an LTE band (e.g., a 50 MHz range of frequencies within LTE Band 41) and block frequencies outside of the desired portion the LTE band (e.g., outside of the desired 50 MHz frequency range).

Signals that traverse the amplifiers and filters of base stations will experience various signal impairments, including group delay, which is a measure of the time delay of the amplitude envelopes of the various sinusoidal components (e.g., subcarriers) of the signal as the signal propagates through a filter and/or amplifier. Group delay is inversely proportional to filter bandwidth and nearly proportional to the order of the filter. In multi-carrier transmission systems, all of the subcarriers of a signal are delayed when the signal propagates through a filter and/or amplifier. However, the delay tends to be frequency-dependent, and thus, the delay will be different for the various subcarriers. For example, subcarriers near the edge of the filter's pass band tend to experience greater group delay than subcarriers in the middle of the filter's pass band.

In LTE networks, group delay variation (GDV) tends to be more problematic than the delay of any individual subcarrier in part because of the way subcarriers are managed and allocated for data transmissions between base stations and UEs. In particular, GDV is the difference between the time delays of the subcarriers of a resource block, or perhaps the difference between the time delays of subcarriers in different resource blocks. These differences in inter-resource block and intra-resource block group delay tend to cause signal distortions that can reduce signal quality and reliability. In practice, such signal distortions may increase when the GDV increases, thereby further reducing signal quality and reliability.

OVERVIEW

Generally, signal distortions may occur for various reasons, such as for reasons other than GDV. For example, a moving UE may be subject to wireless signal distortion due to the Doppler Effect. More specifically, a base station may transmit a signal to the UE over a particular carrier frequency. But due to movement of the UE relative to the base station, the frequency of the signal may change from the UE's perspective and thus the UE may receive the signal over a distorted frequency that is different from the particular carrier frequency (known as a Doppler frequency shift). In practice, such wireless distortion attributable to the Doppler Effect may increase as speed of movement of the UE increases. Other examples are also possible.

Due to there being various factors that may cause signal distortion, a UE sometimes may be subject to overall distortion that is relatively high, which may lead to various problems. For example, a UE may be subject to distortion that is attributable to the Doppler Effect and may also concurrently be subject to distortion that is attributable to a high GDV of a carrier on which the UE is being served. Consequently, the overall distortion may be sufficiently high to cause a significant reduction in signal quality, which may ultimately cause interruptions to a communication in which the UE is engaged, among other outcomes.

Disclosed herein are methods and systems to help minimize the overall distortion experienced by a UE. In accordance with the disclosure, a base station may determine that a speed of movement of the UE is threshold high and may responsively select a carrier (i.e., a carrier on which to serve the UE) based at least on the GDV of the carrier. By way of example, the base station may select a carrier based on the carrier having a threshold low GDV, among other options. And once a carrier is selected, the base station may then serve the UE on the selected carrier. In this manner, given that the base station determined that the UE is fast-moving and thus that the UE is likely subject to distortion attributable to the Doppler Effect, the base station may use the disclosed approach to reduce distortion attributable to GDV, so as to keep the overall distortion to a minimum.

Accordingly, in one respect, disclosed is a method. In accordance with the method, a base station may determine that a speed of movement of a UE is threshold high. Also, the base station may select a carrier on which to serve the UE. Specifically, the base station may respond to the determining that the speed of movement of the UE is threshold high by selecting the carrier based on a GDV of the selected carrier. Once the carrier is selected, the base station may then serve the UE on the selected carrier.

In another respect, disclosed is a wireless communication system. The wireless communication system may include a base station configured to provide an air interface through which the base station is operable to serve one or more UEs. Also, the wireless communication system may include a controller configured to carry out operations. In particular, the operations may involve determining that a speed of movement of a UE is threshold high. Also, the operations may involve selecting a carrier on which the base station should serve the UE. Specifically, responsive to the determining that the speed of movement of the UE is threshold high, the selecting is based on a GDV of the selected carrier. Further, the operations may involve causing the base station to serve the UE on the selected carrier.

In yet another respect, disclosed is another method. In accordance with the method, a base station may make a first determination that a speed of movement of a first UE is threshold high. Then, the base station may make a first selection of a first carrier on which to serve the first UE. Specifically, the base station may respond to the first determination by making the first selection based on the first carrier having a threshold low GDV. The base station may then serve the first UE on the selected first carrier. Further, the base station may make a second determination that a speed of movement of a second UE is threshold low. Then, the base station may make a second selection of a second carrier on which to serve the second UE. Specifically, the base station may respond to the second determination by making the second selection based on the second carrier having a threshold high GDV. The base station may then serve the second UE on the selected second carrier.

Still further, in yet another respect, disclosed is a non-transitory computer-readable medium having stored thereon instructions executable by a processor to cause a base station to carry out functions such as those noted above, to facilitate selection of a carrier on which to serve a UE.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
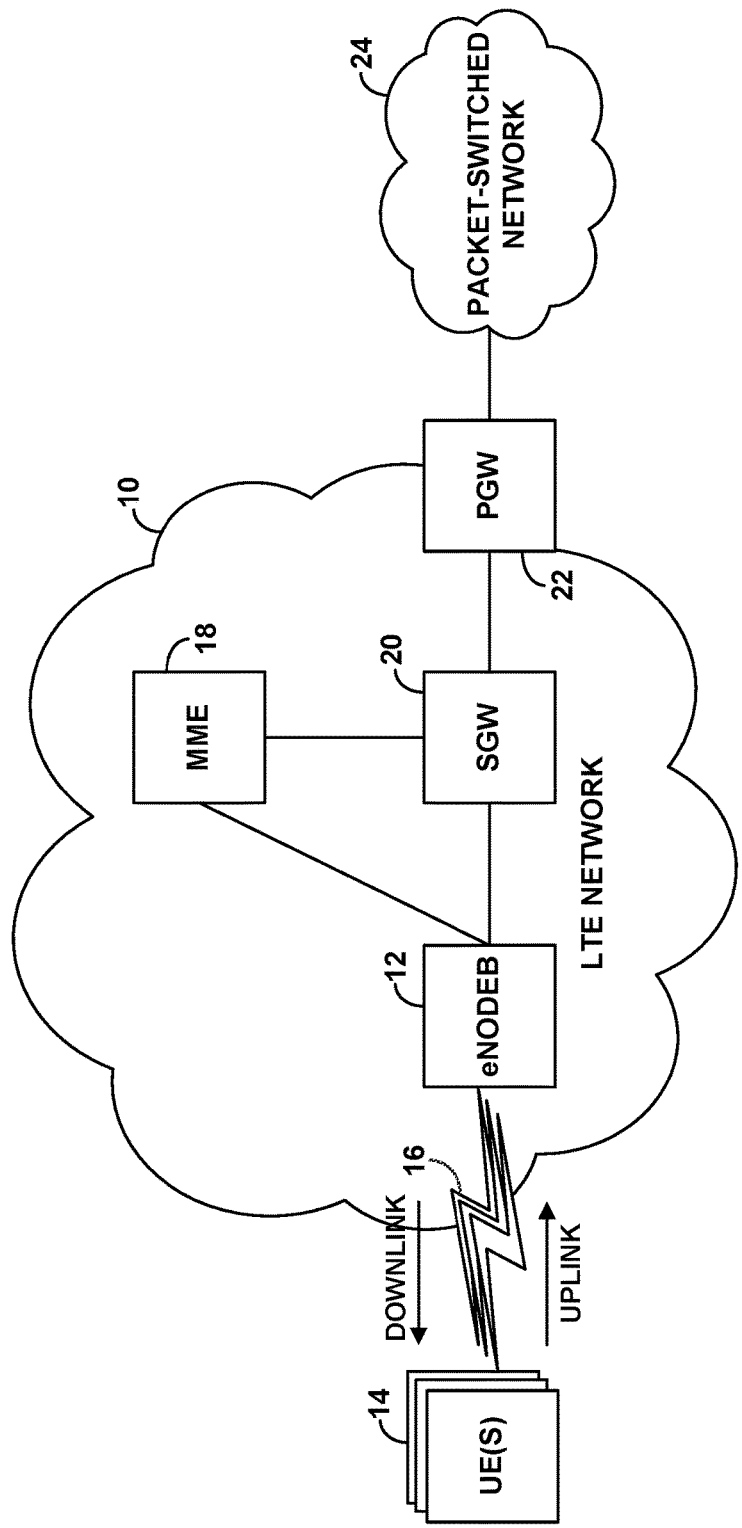
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes at least one example LTE macro base station 12 known as an eNodeB, which has an antenna structure and associated equipment for providing an LTE coverage area in which to serve one or more UEs 14. More specifically, the eNodeB 12 radiates to define one or more wireless air interfaces 16 through which the eNodeB 12 may respectively communicate with one or more served UEs 14 via the downlink and the uplink.

As shown in FIG. 1, the eNodeB 12 has a communication interface with a Mobility Management Entity (MME) 18. The MME 18 can function as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12 may be communicatively linked with a core network, which may be operated by a wireless service provider. The core network then provides connectivity with one or more MMES, such as MME 18, as well as one or more gateways such as SGW 20 and PGW 22.

As noted above, the present disclosure provides for a process that is used to facilitate selection of a carrier so as to help ensure that overall distortion experienced by a UE is minimized. This process could be carried out by eNodeB 12 itself and/or by one or more other network entities, such as with portions of the analysis carried out by an entity outside of the eNodeB 12 (e.g., MME 18) and the eNodeB 12 then responsively working to manage service on a carrier. For simplicity, however, the process will be described here in a scenario where the eNodeB 12 carries out all aspects of the process.

Moreover, the disclosed process could be carried out in various scenarios. For example, selection of a carrier for a UE 14 in accordance with the disclosed process may occur when the UE 14 engages in attach signaling with the eNodeB 12, by which the UE 14 would register to be served by the eNodeB 12 on the selected carrier. In another example, selection of a carrier for a UE 14 in accordance with the disclosed process may occur while the UE 14 is already being served by the eNodeB 12 on a particular carrier, thereby resulting in the eNodeB 12 handing over the UE 14 from being served on the particular carrier to being served on the selected carrier. Other examples are also possible.

Although the disclosed process could be carried out in various scenarios, for simplicity, the process will be described here in a scenario where the eNodeB 12 is already serving a given UE 14 on at least one carrier. Thus, we may assume by way of example (and without limitation) that the one or more UEs 14 are each attached with eNodeB 12 and are thus each being served with wireless communication service by eNodeB 12. As such, we may assume that each UE 14 has worked with eNodeB 12 to establish a Radio Resource Control (RRC) connection defining a respective radio-link layer connection between a respective UE 14 and the eNodeB 12, and that at least one logical bearer has been established between the respective UE 14 and the PGW 22, with the bearer including a radio portion extending between the respective UE 14 and the eNodeB 12 and an access-network portion extending between the eNodeB 12 and the PGW 22 via the SGW 20. Furthermore, we may also assume that the eNodeB 12 has established with each of one or more UEs 14 a respective radio-link layer connection that encompasses at least one respective carrier. So when the eNodeB 12 serves a UE 14, the eNodeB 12 may schedule and engage in communications with that UE 14 on the at least one respective carrier.

In accordance with the disclosed process, the eNodeB 12 may determine that a speed of movement of a UE 14 is threshold high and may responsively use carrier GDV as a basis to select a carrier on which to serve the UE 14. In particular, the threshold high speed of movement of the UE 14 could indicate that the UE 14 may be subject to Doppler Effect based distortion. Consequently, the eNodeB 12 may select a carrier having a GDV that is relatively low, thereby minimizing or at least reducing additional distortion attributable to GDV. As such, once a carrier is selected, the eNodeB 12 may then serve the UE 14 on the selected carrier.

More specifically, the eNodeB 12 may use various techniques to determine a speed of movement of the UE 14, which may define a rate at which the physical position of the UE 14 is changing. By way of example, the UE 14 may include a speed sensor and the UE 14 may be configured to transmit information specifying speed of movement determined by or using the speed sensor. With this arrangement, the eNodeB 12 may receive that information from UE 14 and thus may determine the speed of movement of the UE 14 based on the received information. In practice, the eNodeB 12 may receive the information upon request and/or from time-to-time (e.g., continuously or periodically), among other possibilities.

As another example, the eNodeB 12 may determine the speed of movement of the UE 14 based on coverage-area to coverage-area handover timing. In particular, the eNodeB 12 or other network entity may track handover of the UE 14 from one coverage area to another by tracking coverage area identifiers (e.g., physical cell identifiers (PCIs)) of the various coverage areas on which the UE 14 is served over time. Given this information, the eNodeB 12 may determine speed of movement of the UE 14 based on a rate of change of those coverage area identifiers.

In yet another example, the eNodeB 12 may determine the speed of movement of the UE 14 by querying a location determination platform of the LTE network 10 (not shown in FIG. 1). In particular, the platform may communicate with the serving eNodeB 12 or other entity to obtain signal delay measurements respectively carried out by the UE 14 for various eNodeBs. Assuming that the platform has access to information specifying respective locations of those eNodeBs, the platform may use the eNodeB locations and the obtained signal delay measurements as basis for approximating the location of the UE 14. Then, the platform may refer to a base station almanac specifying satellite locations relative to base station locations and, in doing so, may use the approximate location of the UE 14 to determine nearby satellites to which a global positioning system (GPS) of the UE 14 can tune. As such, the UE 14 may receive information about those satellites from the LTE network 10 and may tune its GPS to those satellites. Using location data about the UE 14 that is received from those satellites, the platform may then use triangulation techniques or the like to determine a specific location of the UE 14. The platform may then determine the speed of movement of the UE 14 by tracking the specific locations of the UE 14 over time, and the platform may report the determined speed of movement to the eNodeB 12. Other examples are also possible.

Once the eNodeB 12 determines the speed of movement of the UE 14, the eNodeB 12 may determine whether or not the determined speed of movement is above a threshold speed. In particular, the eNodeB 12 may have stored thereon or may otherwise have access to information specifying the threshold speed (e.g., established via manual engineering input). Generally, the threshold speed may be any feasible speed. For instance, the threshold speed may be set to a zero value (e.g., zero miles per hour). So in this instance, when the eNodeB 12 determines whether or not the speed of movement of the UE 14 is above the threshold speed (e.g., above the zero value), the eNodeB 12 essentially determines whether the UE 14 is stationary or whether the UE 14 non-stationary. In other instances, however, the threshold speed may be set to a non-zero value (e.g., ten miles per hour).

In either case, if the eNodeB 12 determines that speed of movement of the UE 14 is below the threshold speed, the eNodeB 12 may then responsively proceed to selecting a carrier for the UE 14 without regards to a GDV of the selected carrier. But if the eNodeB 12 determines that speed of movement of the UE 14 is above the threshold speed, the eNodeB 12 may then responsively proceed to selecting a carrier for the UE 14 based on a GDV of the selected carrier. In practice, the GDV of a carrier may be a static value that can be measured and quantified (e.g., in nanoseconds). For this reason, the eNodeB 12 may have stored thereon or otherwise have access to mapping data that respectively maps each of its one or more carriers with a value representing the carrier's GDV. Generally, such mapping data could be established via manual engineering input or using other techniques. With this arrangement, the process of selecting a carrier for the UE 14 based on a GDV of the carrier may take various forms.

In one example embodiment, if the eNodeB 12 determines that speed of movement of the UE 14 is above the threshold speed, the eNodeB 12 may responsively select a carrier having the lowest GDV among two or more candidate carriers. For example, the eNodeB 12 may determine first and second candidate carriers based on factor(s) such as load, among other possibilities. In this example, assuming that the first carrier has a GDV that is lower than a GDV of the second carrier and that the eNodeB 12 determines respective GDVs of those carriers, the eNodeB 12 may select the first carrier based on the first carrier having a GDV that is lower than a GDV of the second carrier, due to the fact that the UE 14 is moving threshold fast.

In another example embodiment, if the eNodeB 12 determines that speed of movement of the UE 14 is above the threshold speed, the eNodeB 12 may responsively select a carrier having a GDV that is lower than a threshold GDV. In particular, the eNodeB 12 may have stored thereon or may otherwise have access to information specifying the threshold GDV (e.g., established via manual engineering input). Generally, the threshold GDV may be set to a value below which GDV-based distortion does not significantly reduce signal quality, among other possibilities. As such, the eNodeB 12 may identify a candidate carrier and may determine GDV of that candidate carrier. And if the eNodeB 12 determines that GDV of the candidate carrier is below the threshold GDV, then the eNodeB 12 may responsively select the candidate carrier as the carrier on which to serve the UE 14. Otherwise, the eNodeB 12 may not select the candidate carrier and may instead identify another candidate carrier to evaluate in accordance with this process, and so on. Other example embodiments are also possible.

As noted above, once the eNodeB 12 selects a carrier on which the served UE 14, the eNodeB 12 may then serve the UE 14 on the selected carrier. In practice, if the eNodeB 12 is already serving the UE 14 on a particular carrier, then the eNodeB 12 may hand over the UE 14 from being served on that particular carrier to being served on the selected carrier. Generally, the handover process may involve signaling between the UE 14 and the wireless communication system (e.g., via eNodeB 12) to facilitate transferring of the UE's connection from one carrier to another carrier, such as by signaling to detach the UE 14 from the particular carrier of eNodeB 12 and then signaling to attach the UE 14 to the selected carrier of the eNodeB 12. Other handover processing is possible as well.

In another situation, if the eNodeB 12 is already serving the UE 14 with carrier aggregation service on two or more carriers, then the eNodeB 12 may reconfigure the carrier aggregation service to include the selected carrier. In doing so, the eNodeB 12 may add the selected carrier to the service and thus may serve the UE 14 on the selected carrier as well as on the two or more carriers that were already included in the service. Alternatively, the eNodeB 12 may replace at least one of the two or more carriers already included in the service with the selected carrier. In either case, the eNodeB 12 may reconfigure the carrier aggregation service by engaging with the UE 14 in RRC connection reconfiguration messaging in which the eNodeB 12 identifies carriers to be included in the carrier aggregation service. Other situations are also possible.

In a further aspect, the eNodeB 12 may carry out the disclosed carrier selection process in response to one or more other determinations in addition to the UE's speed of movement being threshold high. By way of example, the eNodeB 12 may carry out the disclosed carrier selection process in response to the eNodeB 12 additionally determining that the UE 14 is engaged in a high priority communication, such as VoIP communication for instance. In this way, the eNodeB 12 could help ensure that distortions attributable to GDV do not reduce signal quality and reliability when the UE 14 is engaged in a high priority communication.

In particular, the eNodeB 12 may determine a type of communication in which the UE 14 engages, and the eNodeB 12 may then refer to mapping data or the like to determine whether the determined type of communication is one for which the eNodeB 12 should trigger use of the disclosed carrier selection process. And if the eNodeB 12 determines that the type of communication in which the UE 14 is engaged is indeed one for which the eNodeB 12 should trigger use of the disclosed carrier selection process, then the eNodeB 12 may responsively trigger use of the disclosed selection process.

In practice, the eNodeB 12 (and/or other entity) could determine in various ways the type of communication in which a UE 14 engages. For example, the eNodeB 12 could consider the type of bearers, flows, or the like over which the UE 14 engages in certain communication and determine the communication type on that basis. As another example, the eNodeB 12 could engage in deep packet inspection or the like, to read data such as communication setup messaging or communication content itself flowing to or from the UE 14, as a basis to determine the type of communication. Other examples are also possible.

In yet a further aspect, the eNodeB 12 may carry out the disclosed carrier selection process in the context of allocating various carriers to various served UEs 14. More specifically, the eNodeB 12 may identify which served UEs 14 are each moving at a threshold high speed and which served UEs 14 are each moving at a threshold low speed. Then, the eNodeB 12 may assign carriers having threshold low GDV to the served UEs 14 moving at a threshold high speed and carriers having threshold high GDV to served UEs 14 moving at a threshold low speed. In this manner, the eNodeB 12 could help ensure that distortions attributable to GDV do not reduce signal quality and reliability of served UEs 14 that are moving at a threshold high speed.

By way of example, the eNodeB 12 may serve at least first and second UEs 14 and may determine which carrier(s) to respectively assign to the first and second UEs 14. In this example, the eNodeB 12 may have a first carrier and a second carrier to assign, and the first carrier may have a first GDV that is lower than a second GDV of the second carrier. With this arrangement, the eNodeB 12 could thus select either the first or second carrier for the first UE 14 and could similarly select either the first or second carrier for the second UE 14. So as part of the selection process, the eNodeB 12 may make a determination that speed of movement of the first UE 14 is threshold high and may responsively select the first carrier for the first UE 14 based at least on the first carrier having the first GDV that is lower than the second GDV of the second carrier. Once the first carrier is selected, the eNodeB 12 may then serve the first UE 14 on the first carrier. On the other hand, the eNodeB 12 may make a determination that speed of movement of the second UE 14 is threshold low speed and may responsively select the second carrier for the second UE 14 based at least on the second carrier having the second GDV that is higher than the first GDV of the first carrier. Once the second carrier is selected, the eNodeB 12 may then serve the second UE 14 on the second carrier.

Moreover, the eNodeB 12 may take various approaches to make the above-mentioned determination that the first UE 14 is moving at a threshold high speed and as well as the above-mentioned determination that the second UE 14 is moving at a threshold low speed. For instance, the eNodeB 12 may determine that a speed of movement of the first UE 14 is higher than a first threshold speed of movement and may also determine that a speed of movement of the second UE 14 is lower than a second threshold speed of movement. In practice, the first threshold speed of movement may be the same as or different from the second threshold speed of movement. Yet further, in some implementations, the eNodeB 12 making the determination that the first UE 14 is moving at a threshold high speed may simply be a determination that the first UE 14 is non-stationary (e.g., moving at a speed that is above a zero value) and the eNodeB 12 making the determination that the second UE 14 is moving at a threshold low speed may simply be a determination that the second UE 14 is stationary (e.g., moving at a speed of a zero value). Other examples and aspects are possible as well.

Figure 2:
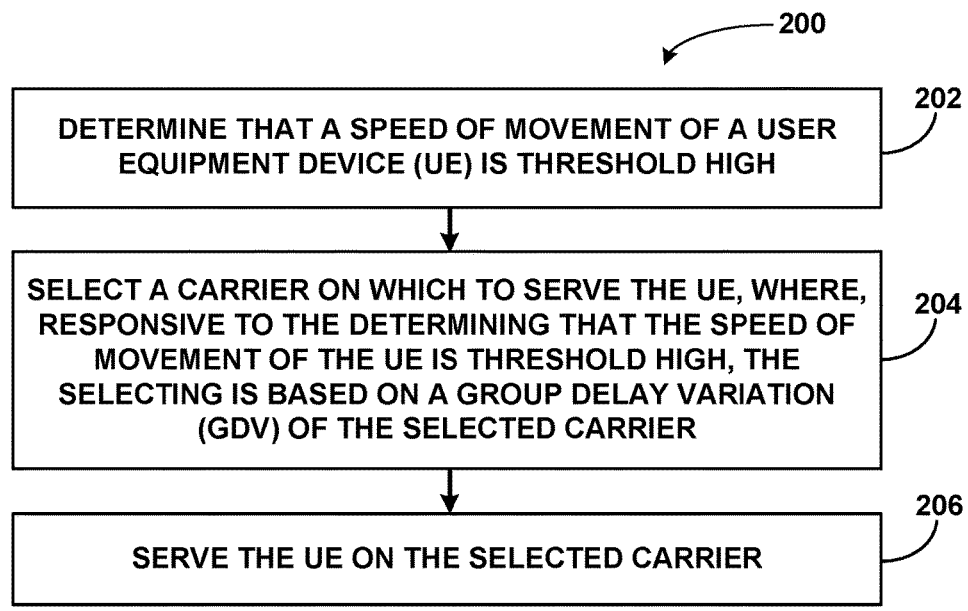
FIG. 2 is a flowchart illustrating a method to facilitate selection of a carrier on which to serve a UE, in accordance with an example embodiment.

FIG. 2 is next a flow chart illustrating a method 200 according to an example embodiment. Illustrative methods, such as method 200, may be carried out in whole or in part by component(s) and/or arrangement(s), such as by the one or more of the components of the representative network shown in FIG. 1 and/or with one or more of the components of the base station shown in FIG. 4 and further discussed below. However, it should be understood that example methods, such as method 200, may be carried out by other entities or combinations of entities as well as in other arrangements, without departing from the scope of the disclosure.

As shown by block 202 in FIG. 2, method 200 involves determining that a speed of movement of a UE is threshold high. Additionally, at block 204, method 200 then involves selecting a carrier on which to serve the UE. Specifically, responsive to the determining that the speed of movement of the UE is threshold high, the selecting is based on a GDV of the selected carrier. Further, at block 206, method 200 then involves serving the UE on the selected carrier.

Figure 3:
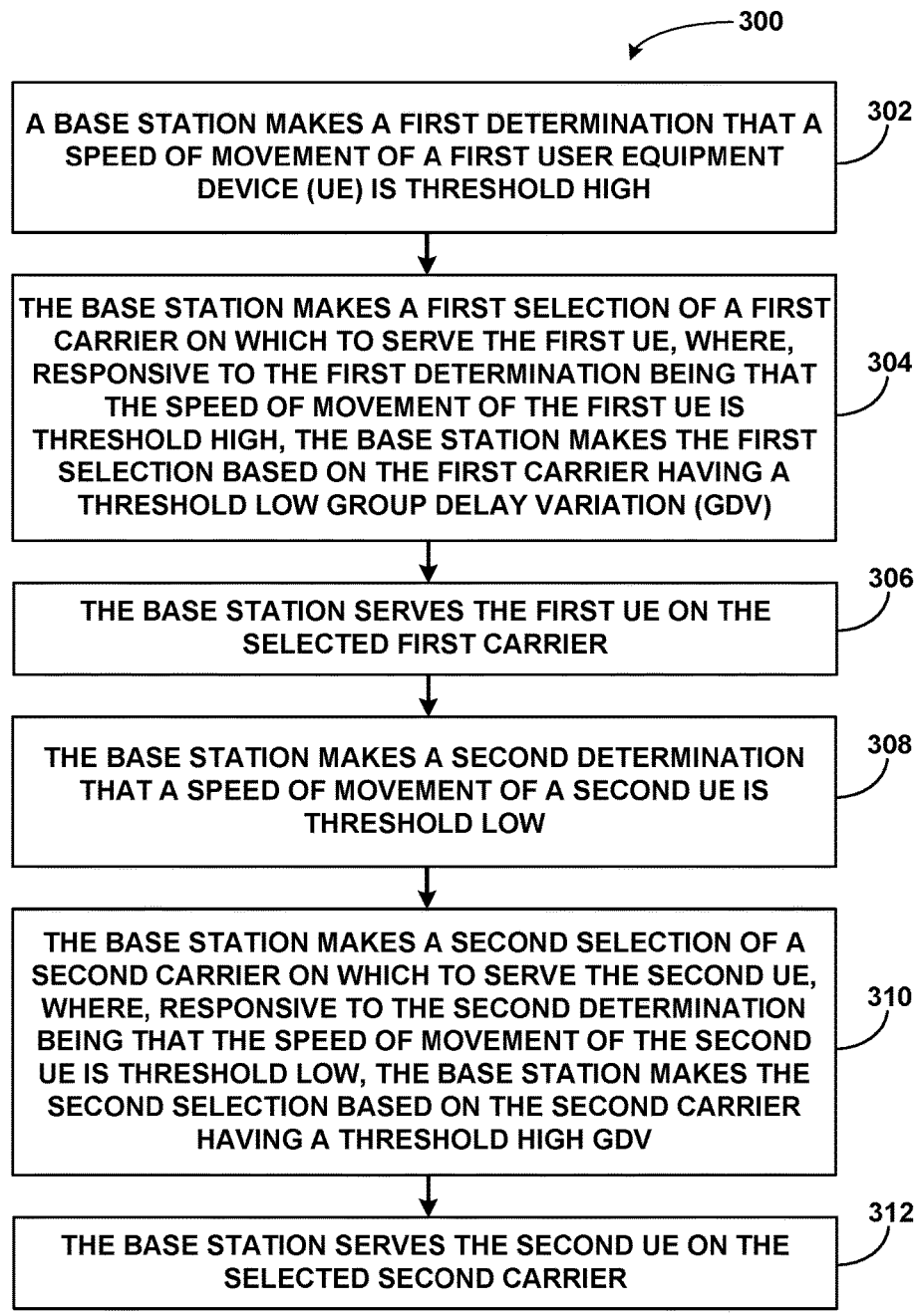
FIG. 3 is another flowchart illustrating a method to facilitate selection of a carrier on which to serve a UE, in accordance with an example embodiment.

FIG. 3 is next a flow chart illustrating a method 300 according to an example embodiment. As shown by block 302 in FIG. 3, method 300 involves a base station making a first determination that a speed of movement of a first UE is threshold high. Additionally, at block 304, method 300 then involves the base station making a first selection of a first carrier on which to serve the first UE. In particular, responsive to the first determination being that the speed of movement of the first UE is threshold high, the base station makes the first selection based on the first carrier having a threshold low GDV. Further, at block 306, method 300 then involves the base station serving the first UE on the selected first carrier. Yet further, at block 308, method 300 then involves the base station making a second determination that a speed of movement of a second UE is threshold low. Yet further, at block 310, method 300 then involves the base station making a second selection of a second carrier on which to serve the second UE. In particular, responsive to the second determination being that the speed of movement of the second UE is threshold low, the base station makes the second selection based on the second carrier having a threshold high GDV. Yet further, at block 312, method 300 then involves the base station serving the second UE on the selected second carrier.

Figure 4:
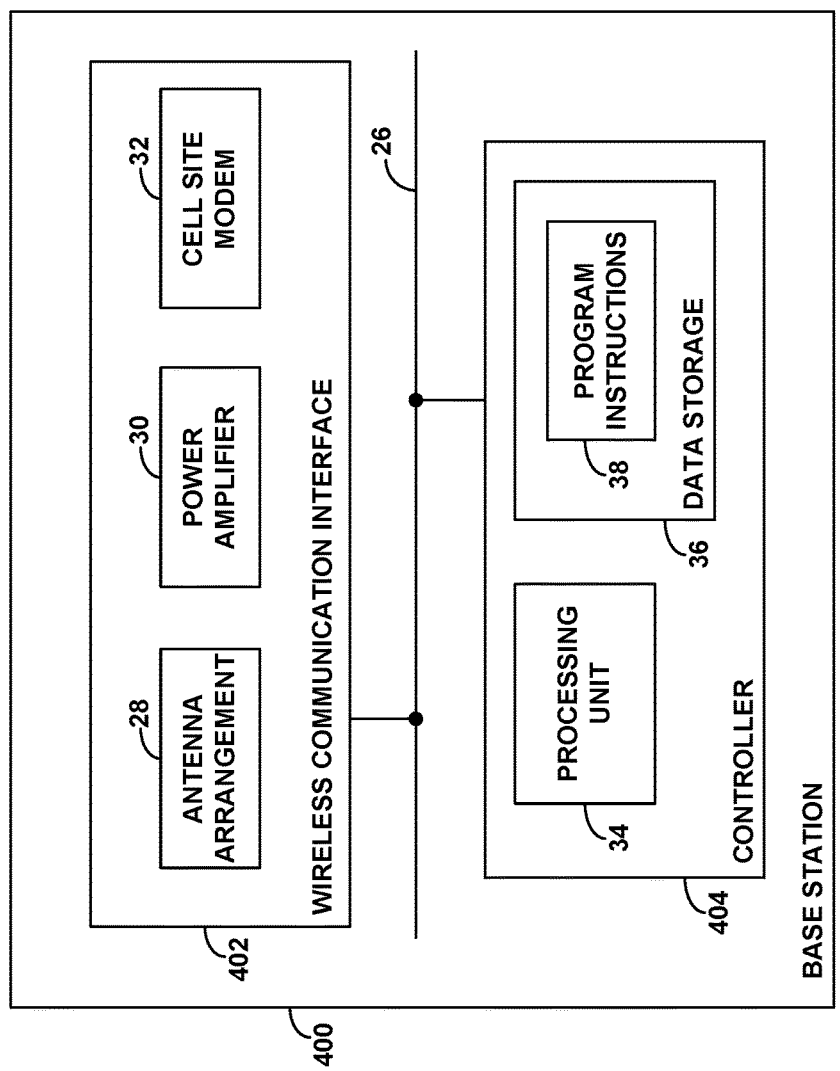
FIG. 4 is a simplified block diagram of a base station in which the present method can be implemented.

Finally, FIG. 4 is next a simplified block diagram of a representative base station 400 such as eNodeB 12, illustrating some of the components that can be included in such an entity. As shown in FIG. 4, the representative base station 400 may include a wireless communication interface 402 and a controller 404. Additionally, these components of the base station 400 may be communicatively linked together by a system bus, network, or other connection mechanism 26. Alternatively, they may be integrated together in various ways.

As shown, wireless communication interface 402 may include an antenna arrangement 28, which may be tower mounted, and associated components such as a power amplifier 30 and a cell site modem 32 for engaging in air interface communication with UEs via the antenna arrangement 28, so as to transmit data and control information to the UEs and receive data and control information from the UEs. Additionally, controller 404 may include processing unit 34 and data storage 36 and is arranged to manage or carry out various functions such as those discussed herein.

Processing unit 34 may then comprise one or more general purpose processors (e.g., microprocessors) and/or special-purpose processors (e.g., digital signal processors and/or application specific integrated circuits) and may be integrated in whole or in part with the wireless communication interface 402. And data storage 36 may include one or more volatile and/or non-volatile storage components, such as magnetic, optical, flash, or other types of non-transitory computer readable media, and may be integrated in whole or in part with processing unit 34.

As shown, data storage 36 may hold (e.g., have encoded thereon) program instructions 38, which may be executable by processing unit 34 to carry out various controller functions. As such, the processing unit 34 programmed with instructions 38 may define part or all of a controller for controlling operation of the base station 400. Alternatively or additionally, however, such control functionality could be provided external to the base station 400, in another entity (e.g., separate from the base station 200) such as by a base station control entity (e.g., MME 18), which may be communicatively linked with the base station and may serve to control certain aspects of base station operation generally.

Exemplary embodiments have been described above. It should be understood, however, that variations from these embodiments are possible, while remaining within the true spirit and scope of the invention.

We claim:

1. A method comprising:
    determining, by a base station, that a speed of movement of a user equipment device (UE) is threshold high;
    selecting, by the base station, a carrier on which to serve the UE, wherein, responsive to the determining that the speed of movement of the UE is threshold high, the selecting is based on a group delay variation (GDV) of the selected carrier; and
    serving, by the base station, the UE on the selected carrier.

2. The method of claim 1, wherein the selecting is between at least first and second carriers, wherein the first carrier has a GDV that is lower than a GDV of the second carrier, and wherein the selecting being based on a GDV of the selected carrier comprises:
    responsive to the determining that the speed of movement of the UE is threshold high, selecting the first carrier based at least on the first carrier having a GDV that is lower than a GDV of the second carrier.

3. The method of claim 1, wherein the selecting being based on a GDV of the selected carrier comprises:
    responsive to the determining that the speed of movement of the UE is threshold high, selecting a carrier based on the selected carrier having a GDV that is lower than a threshold GDV.

4. The method of claim 1, further comprising:
    determining, by the base station, that the UE is engaging in a high priority communication,
    wherein the selecting being based on a GDV of the selected carrier is further responsive to determining that the UE is engaging in a high priority communication.

5. The method of claim 4, wherein the high priority communication is a voice over Internet Protocol (VoIP) communication, and wherein the selecting being based on a GDV of the selected carrier is further responsive to determining that the UE is engaging in the VoIP communication.

6. The method of claim 1, wherein determining that the speed of movement of the UE is threshold high comprises determining that the UE is non-stationary.

7. The method of claim 1,
    wherein, while making the determination, the base station serves the UE on a particular carrier, and
    wherein serving the UE on the selected carrier comprises handing over the UE from being served on the particular carrier to being served on the selected carrier.

8. A wireless communication system comprising:
    a base station configured to provide an air interface through which the base station is operable to serve one or more user equipment devices (UEs); and
    a controller configured to carry out operations including:
        determining that a speed of movement of a UE is threshold high;
        selecting a carrier on which the base station should serve the UE, wherein, responsive to the determining that the speed of movement of the UE is threshold high, the selecting is based on a group delay variation (GDV) of the selected carrier; and
        causing the base station to serve the UE on the selected carrier.

9. The wireless communication system of claim 8, wherein the controller is part of the base station.

10. The wireless communication system of claim 8,
    wherein the selecting is between at least first and second carriers,
    wherein the first carrier has a GDV that is lower than a GDV of the second carrier, and
    wherein the selecting being based on the GDV of the selected carrier comprises, responsive to the determining that the speed of movement of the UE is threshold high, selecting the first carrier based at least on the first carrier having a GDV that is lower than a GDV of the second carrier.

11. The wireless communication system of claim 8, wherein the selecting being based on the GDV of the selected carrier comprises, responsive to the determining that the speed of movement of the UE is threshold high, selecting a carrier based on the selected carrier having a GDV that is lower than a threshold GDV.

12. The wireless communication system of claim 8, wherein the controller is further configured to carry out operations including:
    determining that the UE is engaging in a high priority communication,
    wherein the selecting being based on the GDV of the selected carrier is further responsive to determining that the UE is engaging in a high priority communication.

13. The wireless communication system of claim 12, wherein the high priority communication is a voice over Internet Protocol (VoIP) communication, and wherein the selecting being based on the GDV of the selected carrier is further responsive to determining that the UE is engaging in the VoIP communication.

14. The wireless communication system of claim 8, wherein determining that a speed of movement of a UE is threshold high comprises determining that the UE is non-stationary.

15. A method comprising:
    making a first determination, by a base station, that a speed of movement of a first user equipment device (UE) is threshold high;
    making a first selection, by the base station, of a first carrier on which to serve the first UE, wherein, responsive to the first determination being that the speed of movement of the first UE is threshold high, the base station makes the first selection based on the first carrier having a threshold low group delay variation (GDV);

serving, by the base station, the first UE on the selected first carrier;

making a second determination, by the base station, that a speed of movement of a second UE is threshold low;

making a second selection, by the base station, of a second carrier on which to serve the second UE, wherein, responsive to the second determination being that the speed of movement of the second UE is threshold low, the base station makes the second selection based on the second carrier having a threshold high GDV; and serving, by the base station, the second UE on the selected second carrier.

16. The method of claim 15, wherein making the first determination comprises determining that the speed of movement of the first UE is at or higher than a threshold speed of movement, and wherein making the second determination comprises determining that the speed of movement of the second UE is lower than the threshold speed of movement.

17. The method of claim 15, wherein making the first determination comprises determining that the first UE is non-stationary, and wherein making the second determination comprises determining that the second UE is stationary.

18. The method of claim 15, wherein the first selection is between the first and second carriers, wherein the base station making the first selection based on the first carrier having a threshold low GDV comprises the base station selecting the first carrier based on the first carrier having a GDV that is lower than a GDV of the second carrier, wherein the second selection is also between the first and second carriers, and wherein the base station making the second selection based on the second carrier having a threshold high GDV comprises the base station selecting the second carrier based on the second carrier having a GDV that is higher than the GDV of the first carrier.

19. The method of claim 15, further comprising:

determining, by the base station, that the first UE is engaging in a high priority communication, wherein the first selection being based on the first carrier having a threshold low GDV is further responsive to determining that the first UE is engaging in a high priority communication.

20. The method of claim 19, wherein the high priority communication is a voice over Internet Protocol (VoIP) communication.

* * * * *